US007200601B1

(12) United States Patent
Bradley et al.

(10) Patent No.: US 7,200,601 B1
(45) Date of Patent: Apr. 3, 2007

(54) COMPUTER-READABLE MEDIUM AND DATA STRUCTURE FOR COMMUNICATING TECHNICAL ARCHITECTURE STANDARDS TO VENDORS

(75) Inventors: Michael J Bradley, Birmingham, AL (US); Thomas W. Rehkopf, Roswell, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 601 days.

(21) Appl. No.: 10/210,024

(22) Filed: Jul. 31, 2002

(51) Int. Cl.
G06F 17/00 (2006.01)
G06F 17/30 (2006.01)

(52) U.S. Cl. .................... 707/100; 707/203

(58) Field of Classification Search .......... 707/102, 707/103, 100, 203
See application file for complete search history.

(56) References Cited

U.S. PATENT DOCUMENTS

| | | | | |
|---|---|---|---|---|
| 6,151,643 | A * | 11/2000 | Cheng et al. | 710/36 |
| 6,178,430 | B1 * | 1/2001 | Cohen et al. | 715/501.1 |
| 6,202,207 | B1 * | 3/2001 | Donohue | 717/173 |
| 6,282,709 | B1 * | 8/2001 | Reha et al. | 717/175 |
| 6,542,912 | B2 * | 4/2003 | Meltzer et al. | 715/501.1 |
| 6,584,507 | B1 * | 6/2003 | Bradley et al. | 709/229 |
| 6,678,888 | B1 * | 1/2004 | Sakanishi | 717/172 |
| 6,772,165 | B2 * | 8/2004 | O'Carroll | 707/101 |
| 6,973,479 | B2 * | 12/2005 | Brady et al. | 709/203 |
| 2002/0184535 | A1 * | 12/2002 | Moaven et al. | 713/202 |
| 2003/0229470 | A1 * | 12/2003 | Pejic | 702/179 |

OTHER PUBLICATIONS

U.S. Appl. No. 10/211,225, filed Aug. 2, 2002, entitled "Process for Applying Technology to Organizations and Technical Infrastructure." Inventor: Walton, et al.
U.S. Appl. No. 10/209,712, filed Aug. 1, 2002, entitled "Architectural Council Based Method and System Involving External Entities for Governing the Management and Lifecycle of a Technology Architecture." Inventor: Bradley, et al.
U.S. Appl. No. 10/212,435, filed Aug. 5, 2002, entitled "Architectural Council Based Method and System for Governing the Management and Lifecycle of A Technology Architecture." Inventor: Rehkopf, et al.
U.S. Appl. No. 10/209,389, filed Jul. 31, 2002, entitled "Computer-Readable Medium and Data Structure for Defining and Communicating a Standard Operating Environment." Inventor: Bradley, et al.

* cited by examiner

*Primary Examiner*—Don Wong
*Assistant Examiner*—Thanh-Ha Dang
(74) *Attorney, Agent, or Firm*—Merchant & Gould

(57) ABSTRACT

A computer-readable medium and a data structure for communicating information regarding the current and future components of a technical architecture standard to vendors are provided. The computer-readable medium includes a data structure having a data field containing data identifying a particular component of an information technology architecture for an organization, a data field containing data identifying a current standard for the component, and a data field containing data identifying a future standard for the component. The data structure includes one or more architectural component tags indicative of one component of an information technology architecture for an organization, one or more current standard tags corresponding to each architecture component tag indicative of a current standard for the component of the information technology architecture identified by the architecture component tag, and one or more future direction tags corresponding to each architecture component tag indicative of a future standard for the component of the information technology architecture identified by the architecture component tag.

10 Claims, 14 Drawing Sheets

| SERVICE (68B) | COMPONENT (68C) | TECHNOLOGY STANDARD (68D) | SEGMENT (68A) ||||||| REM-ARKS (68L) |
| | | | VENDOR (68E) | PRODUCT (68F) | CORE (68G) | DECLINING (68H) | RETIRE (68I) | SPECIAL USE (68J) | EMERGING (68K) | |
|---|---|---|---|---|---|---|---|---|---|---|
| GRAPHICAL PRESENTATION | | | | | | | | | | |
| | WEB BROWSER | HTML 4 | NS MSFT | NAVIGATOR EXPLORER | CUR. | | | | | NBS SEG. |
| | WINDOWS APPS. | WIN32 | MSFT | | | CUR. | | | | |
| DISTRIBUTED OBJECT COMPUTING | | | | | | | | | | |
| | INTER-OPERABILITY | CORBA 2.2 | IONA | ORBIX 3.3 | | CUR. | 1Q05 | | | |
| | JDBC | JAVA 2 | MULTI-PLE | DMM SEG. | CUR. | | | | | |
| | ODBC | ODBC | MULTI-PLE | DMM SEG. | CUR. | | | | | |
| DATABASE ACCESS | | | | | | | | | | |
| | ODBC | | | | | | | | | |

Fig. 13.

| ARCHITECTURE COMPONENT (68M) | CURRENT STANDARD (68N) | FUTURE DIRECTION (68P) |
|---|---|---|
| APPLICATION TECHNICAL ENVIRONMENT | | |
| REQUEST/REPLY | ORBIX (CORBA) | ORBIX (CORBA) |
| ASYNCHRONOUS MESSAGING | MQ SERIES | MQ SERIES |
| NETWORK-BASED SERVICES | | |
| WEB BROWSER | INTERNET EXPLORER NETSCAPE COMMUNICATOR | INTERNET EXPLORER |
| ELECTRONIC/INSTANT MESSAGING | MICROSOFT EXCHANGE | MICROSOFT EXCHANGE 2000 |
| DATA MANAGEMENT AND MOVEMENT | | |
| SERVER DBMS | ORACLE 8i | ORACLE 9i |

*Fig. 14.*

COMPUTER-READABLE MEDIUM AND DATA STRUCTURE FOR COMMUNICATING TECHNICAL ARCHITECTURE STANDARDS TO VENDORS

TECHNICAL FIELD

Embodiments of the invention generally relate to the field of business management and, more particularly, to the field of information technology infrastructure evolution and management.

BACKGROUND OF THE INVENTION

Various forms of technology are typically present throughout all facets of a business organization. Technology is so prevalent in many organizations that one or more technology units are created to manage the technology for one or more business units. For example, one technology unit may deal strictly with data storage for the entire organization while several technology units may handle application program development for specific business areas such as a sales or manufacturing.

These technology units may interact with the business units to implement technologies that are used by individuals in the carrying on of the everyday business of the organization. Although each area of a business organization has its own technology needs, the various areas often are interactive and overlapping in practice rather than being isolated from one another. Yet there may be little or no communication between divisions about the technologies that are needed, the retired or to be retired technologies, the technologies that are newly implemented, or the technologies that will be implemented in the future.

Over time, the retirement of technologies and the implementation of new technologies in the various areas can lead to unexpected technology architecture breakdowns or inefficiencies including wasted resources. For example, overlap and interaction between the various areas of the organization dictates that the technologies used for each be compatible with one another, but incompatibilities may result from replacement technologies put in place by one division without a full understanding of the effects throughout the organization. Conversely, new technologies that could be effectively used may go unnoticed because the individual divisions cannot perceive how the new technology might impact many aspects of the organization. Thus, the new technology is avoided for fear of the unknown consequences. Furthermore, technology may be added when no need for the technology exists, or conversely a need experienced throughout the organization may not be addressed.

A lack of cooperation and communication between the various business units and technology units of the organization aggravates these issues. Policies of the particular technologies to be used may not be provided, or if provided, may not be effectively practiced among the diverse business and technology areas of the organization. The result of this lack of cooperation and communication is an ineffective technology architecture that lacks an ability to evolve as needed without creating inefficiencies or failures in the organization.

Along with the communication problems between internal business and technology units, there also exist problems communicating information regarding aspects of a technology architecture utilized by an organization to external suppliers and vendors. In particular, vendors need detailed information regarding aspects of the architecture in order to identify new technologies for use within the architecture. However, organizations are often unwilling to share detailed information regarding their internal technology architectures because this information is typically considered proprietary and may contain sensitive intellectual property. However, without such information, vendors have a difficult time identifying new technologies for use within an architecture.

Therefore, in light of the above, there exists a need for a data structure and computer-readable medium that allow current and future technical architecture standards to be easily and securely communicated to vendors, partners, and other external organizations.

SUMMARY OF THE INVENTION

Embodiments of the present invention solve the above-described problems by providing a computer-readable medium and a data structure for communicating information regarding the current and future components of a technical architecture to vendors. In particular, a computer-readable medium containing a vendor directives data structure is provided according to one embodiment of the invention. The vendor directives data structure includes a data field containing data identifying a particular component of an information technology architecture for an organization. The vendor directives data structure also includes a data field containing data identifying a current standard for the component of the information technology architecture. The vendor directives data structure also includes a data field containing data identifying a future standard for the component of the information technology architecture. According to this embodiment of the invention, the vendor directives data structure is configured to be sent from an architecture lifecycle management server to a server operated by the one or more vendor organizations and used by the vendor organizations to identify technologies compatible with the information technology architecture.

According to another embodiment of the invention, an extensible markup language data structure is provided for use in communicating architecture standard information to one or more vendor organizations. The extensible markup language data structure includes one or more architectural component tags indicative of one component of an information technology architecture for an organization, one or more current standard tags corresponding to each architecture component tag indicative of a current standard for the component of the information technology architecture identified by the architecture component tag, and one or more future direction tags corresponding to each architecture component tag indicative of a future standard for the component of the information technology architecture identified by the architecture component tag. Moreover, the data structure is configured to be sent from an architecture lifecycle management server to a server operated by the one or more vendor organizations and used by the vendor organizations to identify technologies compatible with the information technology architecture.

Additional details regarding aspects of the various embodiments of the present invention will become apparent from the detailed description that follows.

BRIEF DESCRIPTION OF THE DRAWINGS

FIG. 13 is a data structure diagram illustrating aspects of a standard operating environment data structure provided according to the various embodiments of the invention; and FIG. 14 is a data structure diagram illustrating aspects of a vendor directives data structure provided according to the various embodiments of the invention.

DETAILED DESCRIPTION OF AN ILLUSTRATIVE EMBODIMENT

Embodiments of the present invention provide organizational structures whose operation facilitates the advancement of the technology architecture of a business organization. The organizational structures implement various processes to filter through available and up and coming technologies to narrow down the technologies that are to be further investigated or that are to be implemented. These processes result in a standard operating environment description and a vendor directives description which are used to allow outside vendors to assist in implementing the technologies.

In the following detailed description, references are made to the accompanying drawings that form a part hereof, and in which are shown by way of illustration specific embodiments or examples. These embodiments may be combined, other embodiments may be utilized, and structural changes may be made without departing from the spirit and scope of the present invention. The following detailed description is, therefore, not be taken in a limiting sense, and the scope of the present invention is defined by the appended claims and their equivalents.

Figure 1:
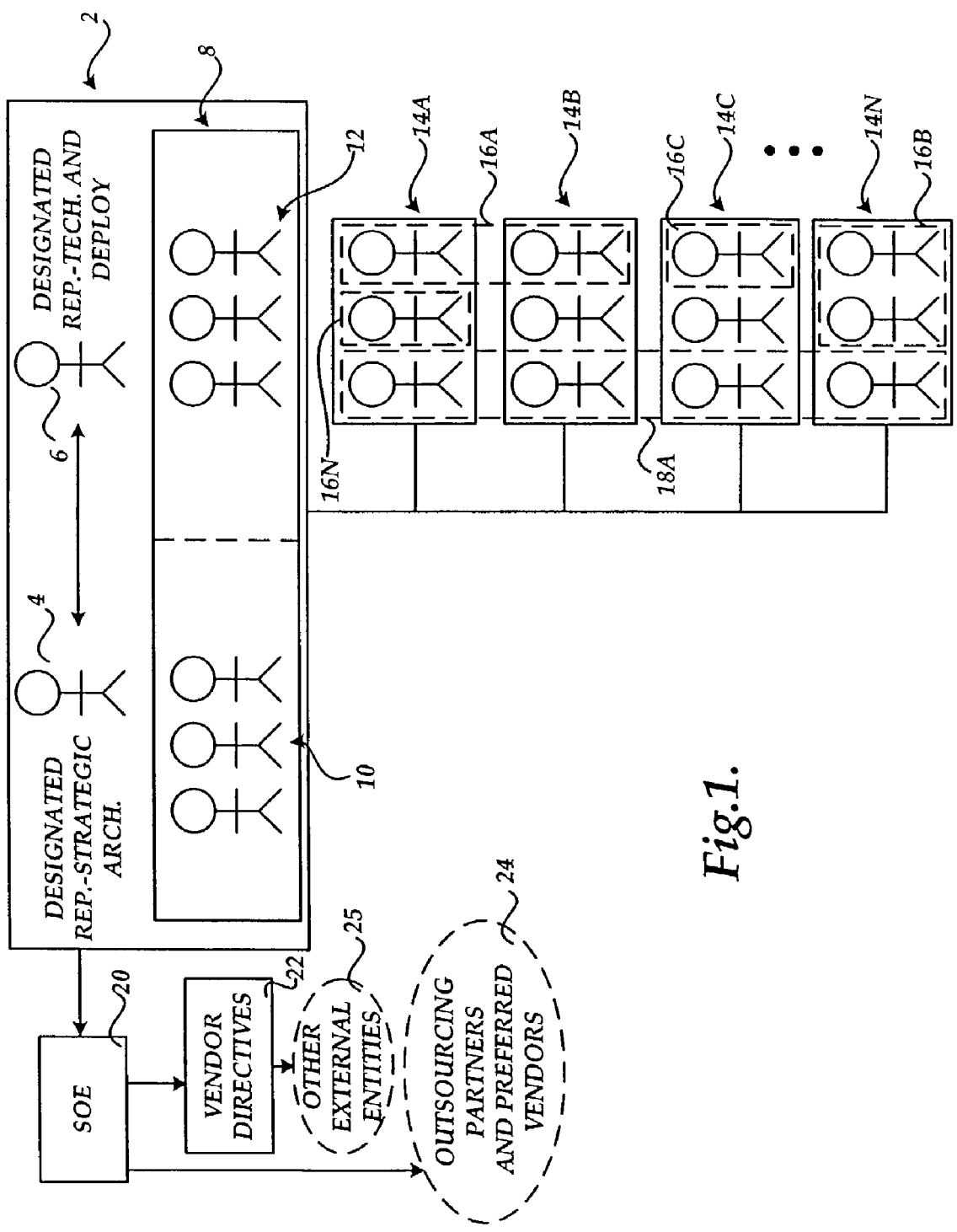
FIG. 1 is a block diagram illustrating an organizational structure for managing the implementation and evolution of an information technology architecture provided according to one embodiment of the invention.

Referring now to the drawings, in which like numerals represent like elements through the several figures, aspects of the present invention and the exemplary operating environment will be described. FIG. 1 shows one embodiment of an organizational structure for managing the implementation and evolution of an information technology architecture. The organization structure of FIG. 1 includes an architectural council 2 who governs the development of the technology architecture. The council 2 includes key technologists, architects, and organizational technology community representatives. The council 2 develops and maintains the high-level technology architecture policy and documents it. The council 2 performs knowledge management and sharing of architecture information and develops the architectural standards, strategies, guidelines, products, and best practices.

The architectural council 2 is made up of a designated representative of the office of strategic architecture 4 who makes the final decisions of the council to develop the technological architecture's current and future direction. The architectural council 2 also includes a designated representative of the office of technology deployment and operations 6 who along with the designated representative of the office of strategic architecture makes the final decisions of the council by either blocking or agreeing with the decision of the designated representative of the office of strategic architecture.

In addition to the designated representative of the office of strategic architecture 4 and designated representative of the office of technology deployment and operations 2, the council 2 includes council members 8. The council members 8 are made up of core members 10 and extended members 12. Overall the council members 8 make proposals to the designated representative of the office of strategic architecture and designated representative of the office of technology deployment and operations through the study and communication of specific technologies that are available, specific technologies that are currently implemented, and the integration of the specific technologies that are available with the specific technologies that are implemented. Specifically, the core members 10 formulate and express the recommendations to the designated representative of the office of technology deployment and operations and designated representative of the office of strategic architecture by attending and actively participating in council meetings. The extended members 12 assist the core members in the study of issues and also attend the meetings to provide support to the core members 10 where needed.

The architectural council 2 receives input from several bodies that act as delegates. The bodies include segment teams 14A–N, special interest groups ("SIGS") 16A–N and solution teams 18. The segment teams 14A–N are divided so that each segment team is responsible for its own technology area. For example, one segment team is responsible for system graphical presentation while another segment team is responsible for database access. These segments are reflected in a standard operating environment description 20 such as the database structure shown in FIG. 13.

The segment teams 14A–N are permanent groups of individuals that serve as subject matter experts in their specific technical area. Examples of segments include data network, network based services, network and systems management, development, application technical environment, platforms, content management, security, storage, and telephony. The segment teams 14A–N lead the evolution of the content of the particular technical segment including determining the proposed vision, principles, best practices, strategies, and standards that will ultimately be documented for the business organization upon approval by the council 2. The segment teams 14A–N are responsible for keeping the technical architecture current by periodically recommending updates to the council 2. The segment teams 14A–N may provide consultation in regard to standards and directions and collaborate directly with the council 2 to provide guidance, develop the standards, policies, and architectures. Segment teams meet periodically as a group to review cross-segment technology issues and recommend standards changes or SIGs as described below.

Each segment team sponsors or sets forth one or more SIGs 16A–N to investigate the available and up and coming technologies for a particular segment. The SIGs 16A–N also investigate the technologies for a segment that are currently in use in the business organization. As shown in FIG. 1, the SIGs may be made up of one or more individuals 16B, 16C only from one segment team or from individuals 16A from multiple segment teams where technology to be investigated does not fit only within one segment.

The SIGs 16A–N exist so long as there is an interest and a need as dictated by the segment teams 14A–N within specific areas of technologies, for example XML being a specific technology that is of interest to one or more of the segment groups. The SIGs may provide models for the integration of the technology into the business organization and provide expertise to the segment teams 14A–N and to solution teams 18 discussed below. The SIGs may recommend standards to the segments teams 14A–N and/or solution teams 18 for specific technologies being reviewed.

Solution teams 18 are made up of individuals from multiple segment teams 14A–N. The solution teams 18 determine how the various technologies being investigated or implemented will fit and work together within the technology architecture currently in place in the organization. The solution teams 18 exist to provide solutions for specific needs of the organization such as enterprise directory services, voice portal strategies, and sales force automation. The solution teams 18 thus serve on a project basis as subject matter experts in the various areas of technology involved in the project. Solution teams 18 develop the solutions to problems and model multiple potential implementations where available. The solution teams 18 develop and document the solutions in terms of strategies and models and then provide necessary consulting on the use of the solutions.

The information flows from the SIGs 16A–N to the segment teams 14A–N and/or to the solution teams 18. The information being filtered by these delegates are transferred up the chain to the council 2 where members make recommendations so that final decisions regarding further investigation or implementation can be made. The council ratifies the further investigation or implementation by the communication of recommendations to the designated representative of the office of strategic architecture and designated representative of the office of technology deployment and operations who then vote in or block the recommendation from further escalation, where further escalation may include either further consideration and development or actual implementation of a technology. The product of this ratification is the development or modification to the standard operating environment description 20 and to a vendor directives description 22.

The standard operating environment description ("SOE") 20, discussed in greater detail below, sets forth the segments and the implemented technologies of the organization for each segment. Also specified for each implemented technology is its current stage within the lifecycle of the technology. The SOE is conveyed to outsourcing partners and preferred vendors 24 to allow these external entities to easily see the technologies being implemented and the amount of life remaining in the current implementation. Thus, the SOE allows the external entities to provide only those products and services that are compatible with the existing technologies of the organization and to be prepared for technology changes.

The vendor directives description ("VD"), also discussed in greater detail below, sets forth the standard of products currently implemented in the specific areas of technology within each of the segments. The VD also sets forth the future direction the standard of products will go. The VD are derived from the SOE and are used to provide standards information to non-preferred external entities rather than to the outsourcing partners and preferred vendors who receive the SOE. Thus, the VD allows the other external entities 25 who do not have access to the SOE to be prepared for providing assistance in the transition from the current product standards to the future direction and to be prepared to supply goods and services in accordance with the future direction.

Figure 2:
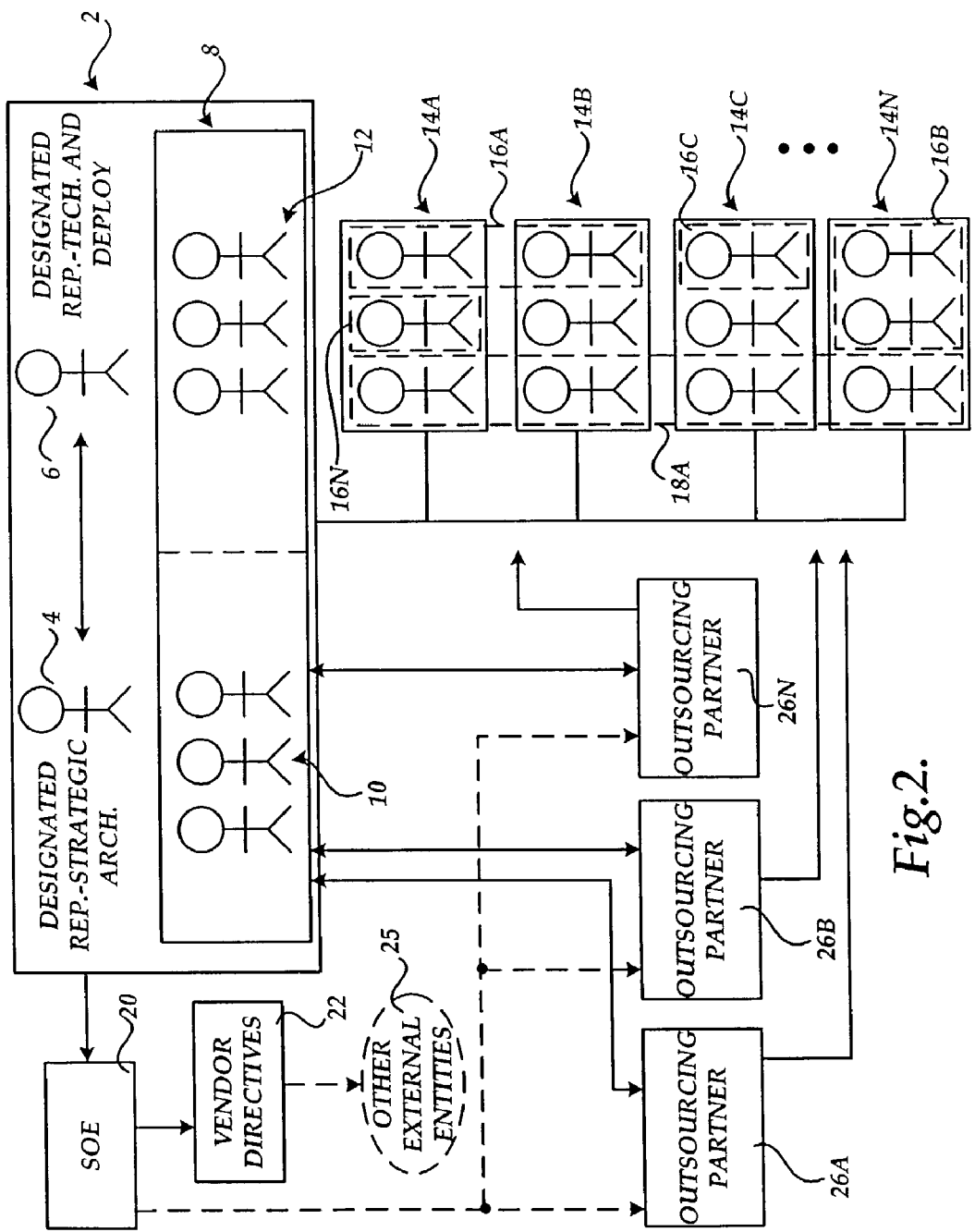
FIG. 2 is a block diagram illustrating an organizational structure that includes external entities for managing the implementation and evolution of an information technology architecture provided according to one embodiment of the invention.

FIG. 2 shows one embodiment of an organizational structure that includes external entities for managing the implementation and evolution of an information technology architecture. The organization structure of FIG. 2 includes the council architecture 2 as discussed in relation to FIG. 1 including the designated representative of the office of strategic architecture 4, designated representative of the office of technology deployment and operations 6, and group of members 8. However, the members 8 including both the core members 10 and/or extended members 12 include members of the outsourcing partners 26A–N.

The outsourcing partners 26A–N will ultimately provide the goods and services to implement all existing and future directions of the technology architecture. Therefore, the embodiment of FIG. 2 gives the outsourcing partners 26A–N a voice in the council 2 so that decisions made that affect the SOE 20 and VD 22 may be influenced by the same outsourcing partners 26A–N who will receive direction from the SOE 20 and VD 22. So the outsourcing partners 26A–N are able to interact with members of the business organization in the council 2 as well as other outsourcing partners 26A–N to achieve a fully collaborative team. The input from the outsourcing partners 26A–N allows the SOE 20 and VD 22 to define current and future standards and practices that may be more effectively brought about since any potential difficulties can be worked through or eliminated by the outsourcing partners' participation with the council 2 before the SOE 20 and VD 22 are modified.

In addition to members of the outsourcing partners 26A–N being involved in the higher-level activities of the council 2, the outsourcing partners 26A–N may also have members who participate in the delegations of the council 2. Thus, segment teams 14A–N, SIGs 16A–N, and solution teams 18 as discussed above in relation to FIG. 1 may include members of the outsourcing partners 26A–N. This is beneficial to the organizational structure because the outsourcing partners 26A–N are often in the best position to assess new and up and coming technologies for the particular technology segments. Additionally, because the outsourcing partners 26A–N will be responsible for much or all of the implementation, the input of the outsourcing partners 26A–N in determining the fit of the various technologies across the various business and technology units of the company may reduce lag time and redundant efforts across the various outsourcing partners.

Figure 3:
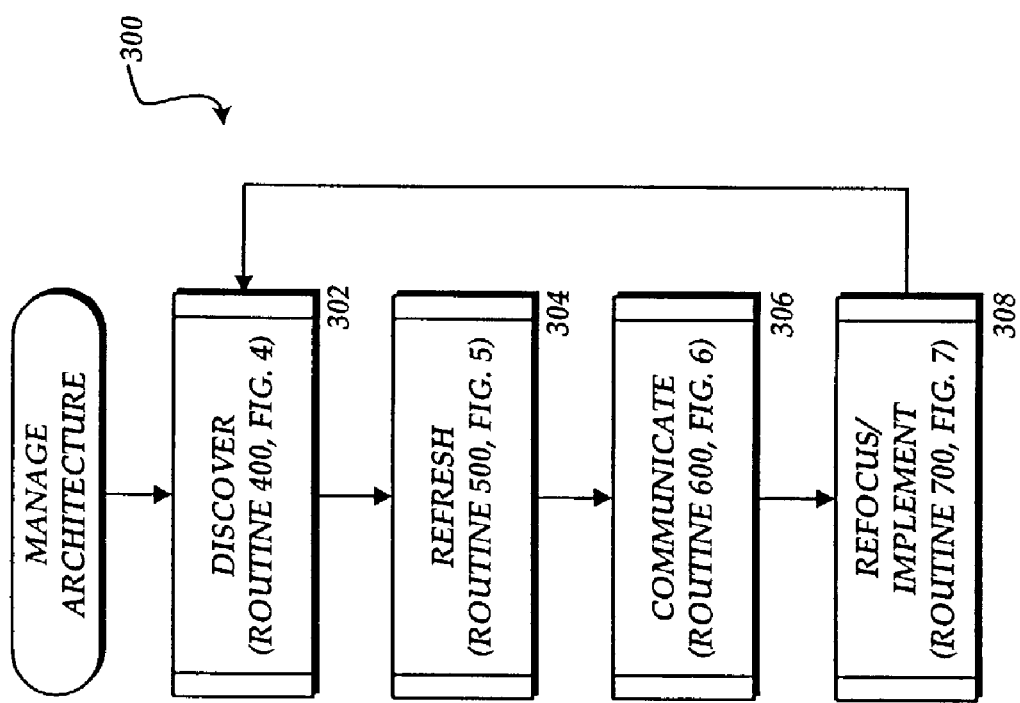
FIG. 3 is a flow diagram showing an illustrative routine for managing a technology architecture provided according to one actual embodiment of the present invention.

Referring now to FIG. 3, an illustrative routine 300 will be described for managing the lifecycle of a technology infrastructure for an organization. The routine 300 begins at block 302, where technologies and technology trends are discovered that are related to the information technology infrastructure. Additionally, gaps may be identified between the technology infrastructure and new or emerging technologies. Additional details regarding the discovery of new technologies and technology gaps is provided below with respect to FIG. 4.

From block 302, the routine 300 continues to block 304, where a technology roadmap and a technology desired state are refreshed, or updated, using the results of the discovery that took place at block 302. The technology roadmap defines future directions for the information technology to ultimately arrive at a desired state, specified by the technology desired state. In order to update the technology roadmap and technology desired state, the technology trends and technology gaps identified at block 302 are incorporated into the technology roadmap and technology desired state. Additional details regarding updating the technology roadmap and technology desired state are provided below with respect to FIG. 5.

From block 304, the routine 300 continues to block 306, where the updated technology roadmap and technology desired state are communicated to, and reviewed with, one or more business and technical units within the organization. Based upon the review, the updated technology roadmap and technology desired state may be revised and finalized. Additional details regarding communicating the technology roadmap, technology desired state, SOE 20, and vendor directives 22 are provided below with respect to FIG. 6.

From block 306, the routine 300 continues to block 308, where identified technologies may be implemented and where the focus of other technologies under consideration is narrowed. The SOE 20 and vendor directives 22 may also be updated based upon the updated technology roadmap and technology desired state. The SOE 20 and vendor directives 22 may then be communicated to external organizations, such as the vendors or providers 24. Additional details regarding the implementation of identified technologies and refocusing the technology context will be described in greater detail below with respect to FIG. 7.

From block 306, the routine 300 returns to block 302, where another iteration is performed with the narrowed technology context and the updated technology roadmap, technology desired state, SOE 20, and vendor directives 22. Additional details regarding the various iterations of the routine 300 will be provided below with respect to FIG. 8.

Figure 4:
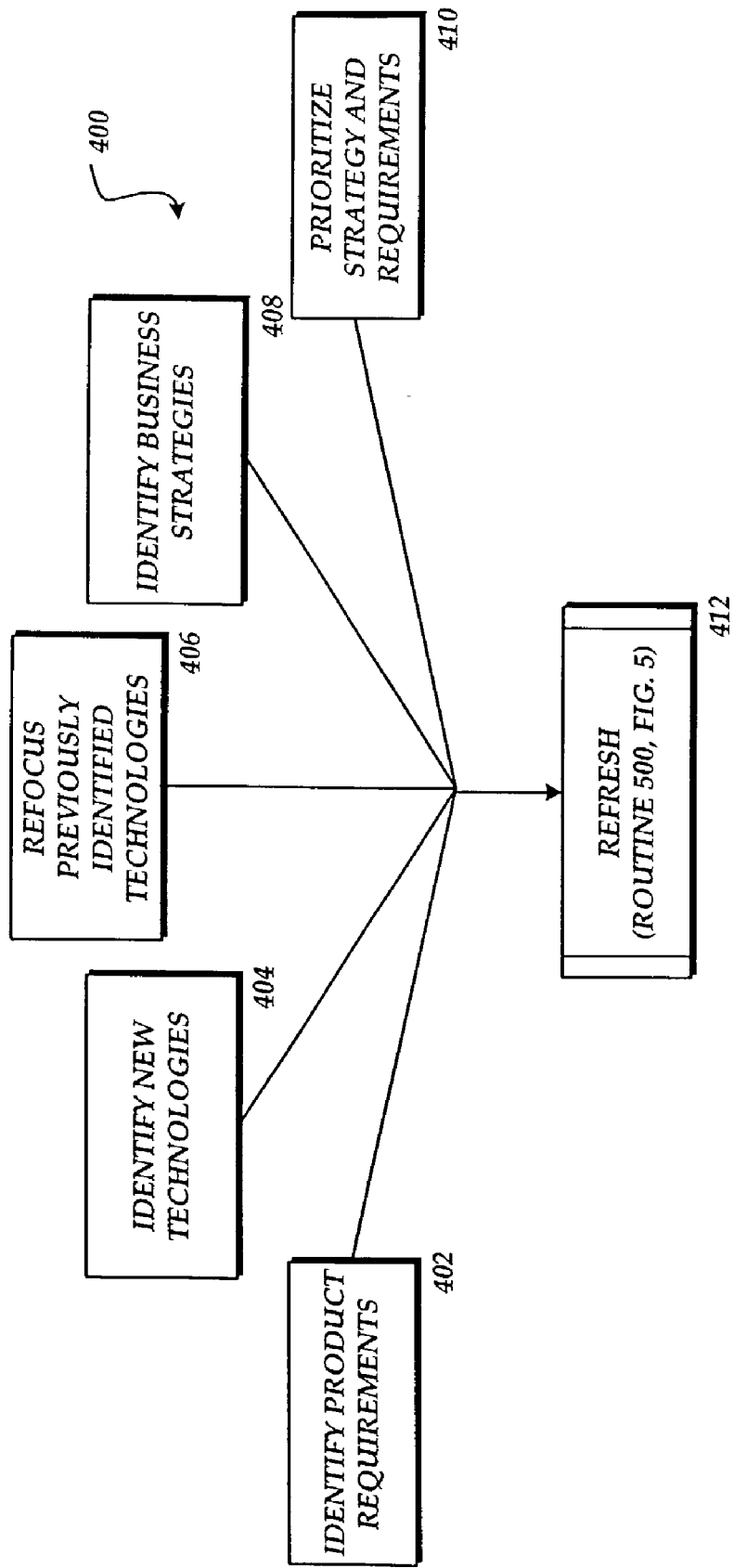
FIG. 4 is a flow diagram showing an illustrative routine for discovering information relating to a technology architecture provided in one embodiment of the invention.

Turning now to FIG. 4, additional details regarding the discovery of new technologies and technology gaps will be provided. In particular, the routine 400 will be described for discovering new technologies related to the technology infrastructure. As discussed above with reference to FIG. 3, new technologies and technology trends are identified at block 404. In particular, new technologies and technology trends are identified that may be of use within the technology infrastructure. Moreover, technology gaps may be identified between the existing technology roadmap, the technology desired state, and technology trends. In order to identify new technologies and technology trends, product requirements may also be identified at block 402. Additionally, business strategies may also be identified at block 408. The product requirements and business strategies may impact the types of new technologies and technology trends that are identified as potentially relevant to the technology infrastructure.

According to various embodiments of the invention, new technology trends related to the technology infrastructure may comprise identifying new technologies not utilized within the technology infrastructure. Additionally, technology trends may be identified by discovering changes in technologies utilized in the technology architecture. Technology trends may also be identified by identifying information technology needs of the organization not being met by the technology infrastructure. Additional methods may be utilized to identify new technologies, technology trends, and the gaps between the technology trends and the technology infrastructure.

Once the technology trends and new technologies have been identified, a technical strategy and requirements may be prioritized at block 410. Additionally, the focus may be narrowed at block 406 for previously identified technologies in order to focus on more detailed aspects of these technologies. Once the discovery phase represented by the routine 400 has completed, the routine continues block 412, where the technology roadmap and the technology desired state are updated. This process is described in greater detail below with reference to FIG. 5.

Figure 5:
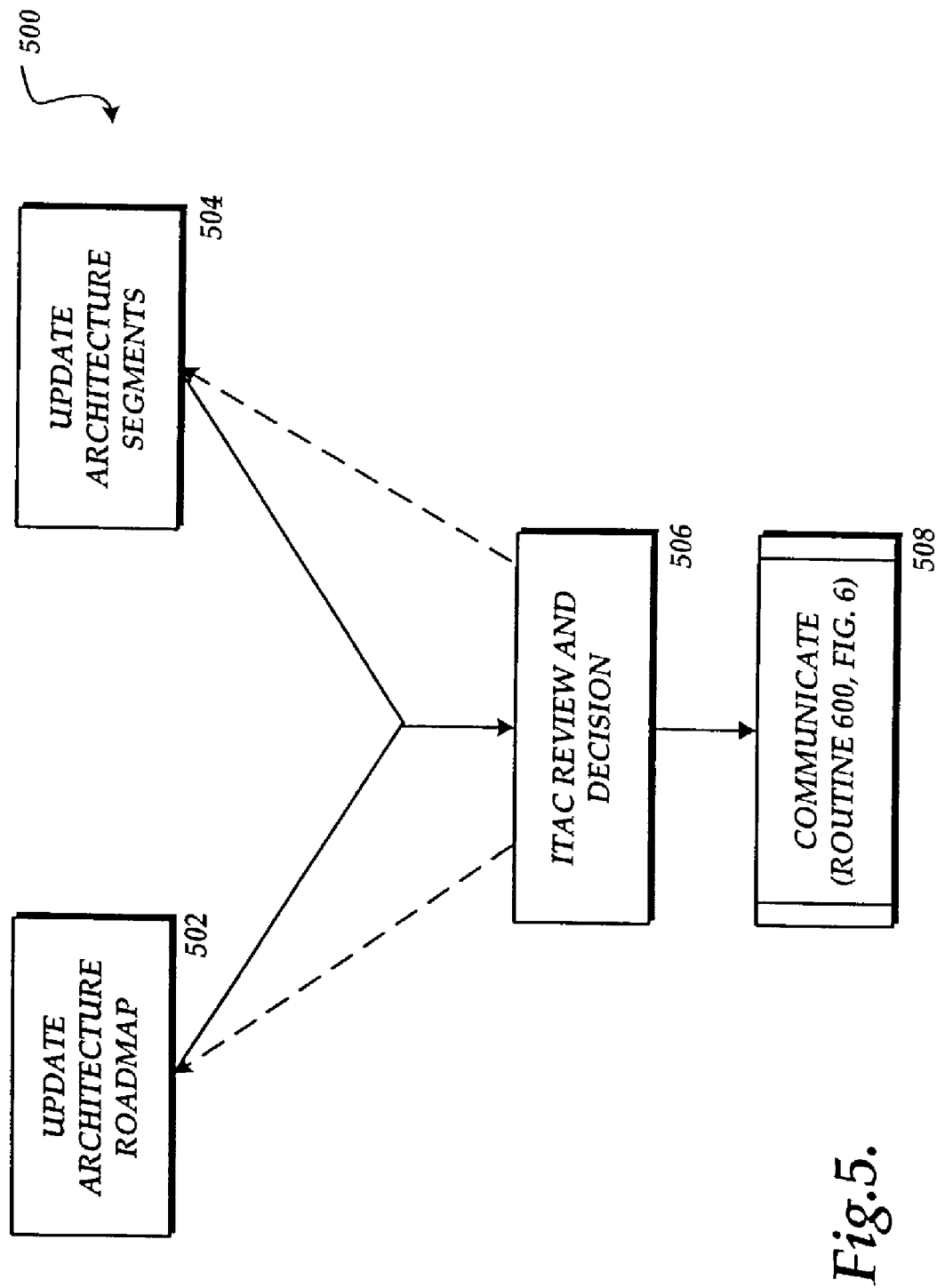
FIG. 5 is a flow diagram showing an illustrative routine for refreshing a technology architecture provided in one embodiment of the present invention.

Referring now to FIG. 5, additional details regarding updating the technology roadmap and technology desired state will be provided. In particular, a routine 500 will be described for updating the technology roadmap and technology desired state in view of newly discovered technologies and technology trends. The routine 500 begins at block 502, where the technology roadmap and technology desired state are updated to reflect the newly discovered technologies and technology trends. Additionally, the technology roadmap and technology desired state may also be revised to include a more focused description of previously identified technologies. In parallel with the revision of the technology roadmap, the coverage of the technology segments may also be revised to cover the newly identified technologies and technology trends at block 504.

Once the technology roadmap, the technology desired state, and the segments have been revised, the changes are submitted to the council 2 for review at block 506. If the council 2 disapproves of the revisions, the routine 500 may return to blocks 502 and 504 for additional revision of the technology roadmap, the technology desired state, and the segments. If, however, the council 2 approves of the revised technology roadmap, the technology desired state, and segments, the routine 500 continues to block 508, where the technology roadmap and technology desired state are communicated to the technology community. Additional details regarding the communication of the technology roadmap to the technology community are provided below with reference to FIG. 6.

Figure 6:
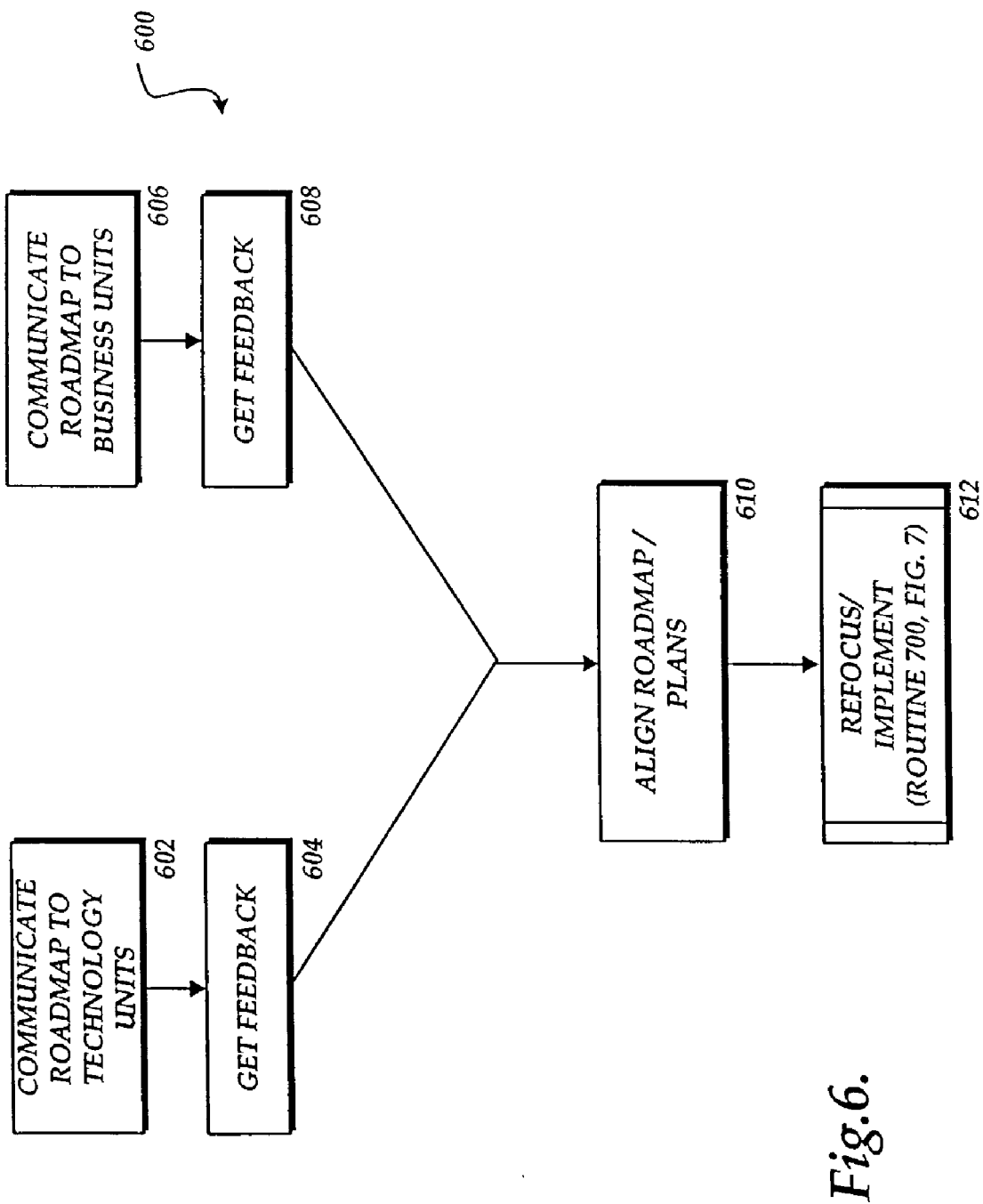
FIG. 6 is a flow diagram showing an illustrative routine for communicating a refreshed technology architecture provided in one embodiment of the present invention.

Referring now to FIG. 6, additional details regarding communicating the technology roadmap will be provided. In particular, the routine 600 will be described that illustrates additional aspects of the process for communicating the technology roadmap to technical and business units. The routine 600 begins at blocks 602 and 606, where the technology roadmap is communicated to technology units and business units within the organization. The technology roadmap may be communicated to the technology and business units through electronic means, such as electronic mail or web-based communications, or through more conventional means. The technology desired state may also be communicated to the technology and business units similarly.

Once the business and technical units have received the technology roadmap and technology desired state, these units review the contents of the technology roadmap. The business and technology units may then provide feedback at blocks 604 and 608 regarding the contents of the technology roadmap and the technology desired state. Based upon the feedback, the technology roadmap and technology desired state may be revised and finalized at block 610. From block 610, the routine 600 continues to block 612, where the context of the technology review is refocused and technologies ready for implementation are actually implemented. Additional details regarding this process are provided below with reference to FIG. 7.

Figure 7:
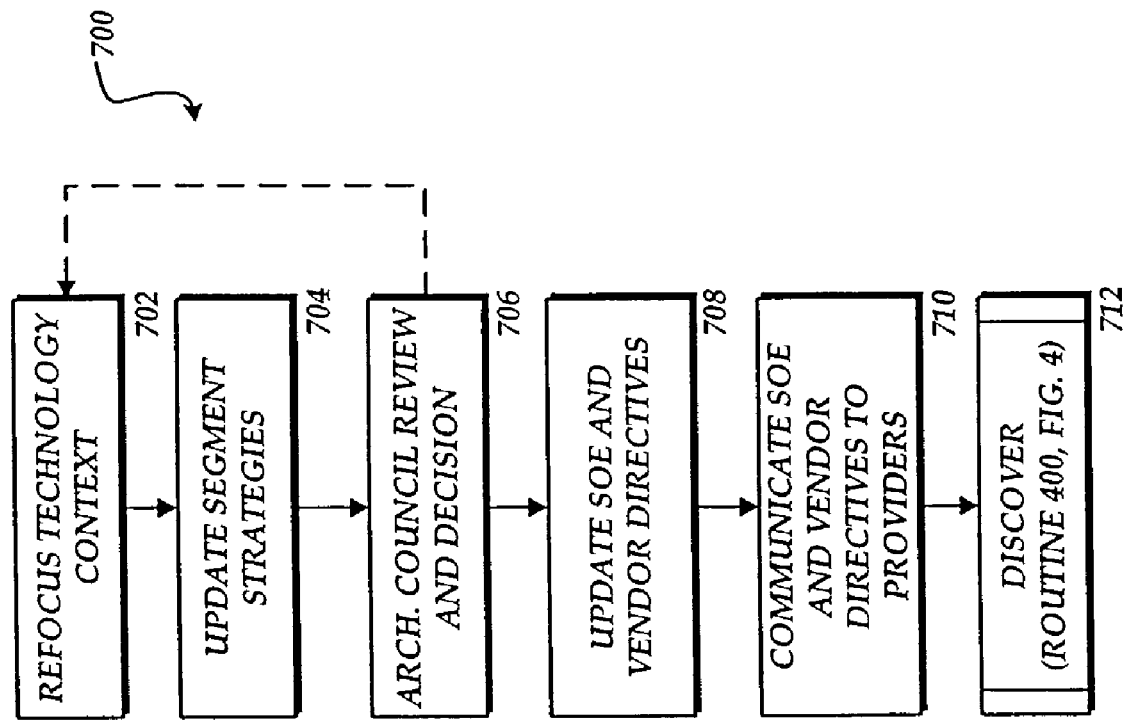
FIG. 7 is a flow diagram showing an illustrative routine for refocusing and implementing aspects of a technology architecture provided in one embodiment of the invention.

Turning now to FIG. 7, additional details regarding the implementation of identified technologies and refocusing the technology context will be provided. In particular, the routine 700 will be described for refocusing the technology context, updating the SOE 20 and vendor directives 22, and for implanting technologies. The routine 700 begins at block 702, where the technology context is refocused. This allows a greater degree of focus to be applied to previously identified technologies. In this manner, the analysis of technologies to be utilized in the technology infrastructure to proceed from a general analysis to an actual implementation of the technology.

From block 702, the routine 700 continues to block 704, where strategies for each of the segments teams 14A–N are updated in view of the revised technology focus. The routine 700 then continues to block 706, where the updated segment team strategies are reviewed by the council 2. If the council 2 does not approve of the updated segment team strategies, the routine 700 may branch back to block 702, where the strategies may be revised. If the council 2 approves of the updated strategies, the routine 700 continues to block 708, where the SOE 20 and the vendor directives 22 are revised based upon the finalized technology roadmap and technology desired state.

From block 708, the routine 700 continues to block 710, where the revised SOE 20 and vendor directives 22 are communicated to external organizations. For instance, according to one embodiment of the invention, the SOE 20 and vendor directives 22 may be transmitted to a sourcing partner of the organization, a vendor or potential vendor of the organization, or providers of the organization. Additionally, the SOE 20 and the vendor directives 22 may be communicated to internal business and technical organizations.

From block 710, the routine 700 continues to block 712, where it returns to routine 400, described above with respect to FIG. 4. In this manner, each of the processes identified in FIG. 3 are repeated. It should therefore be appreciated that the methods provided herein are iterative and may be performed repeatedly to continually refine the technology infrastructure and to integrate new and emerging technologies into the infrastructure. Additional details regarding the iterative nature of the various processes described herein will be provided below with respect to FIG. 8.

Figure 8:
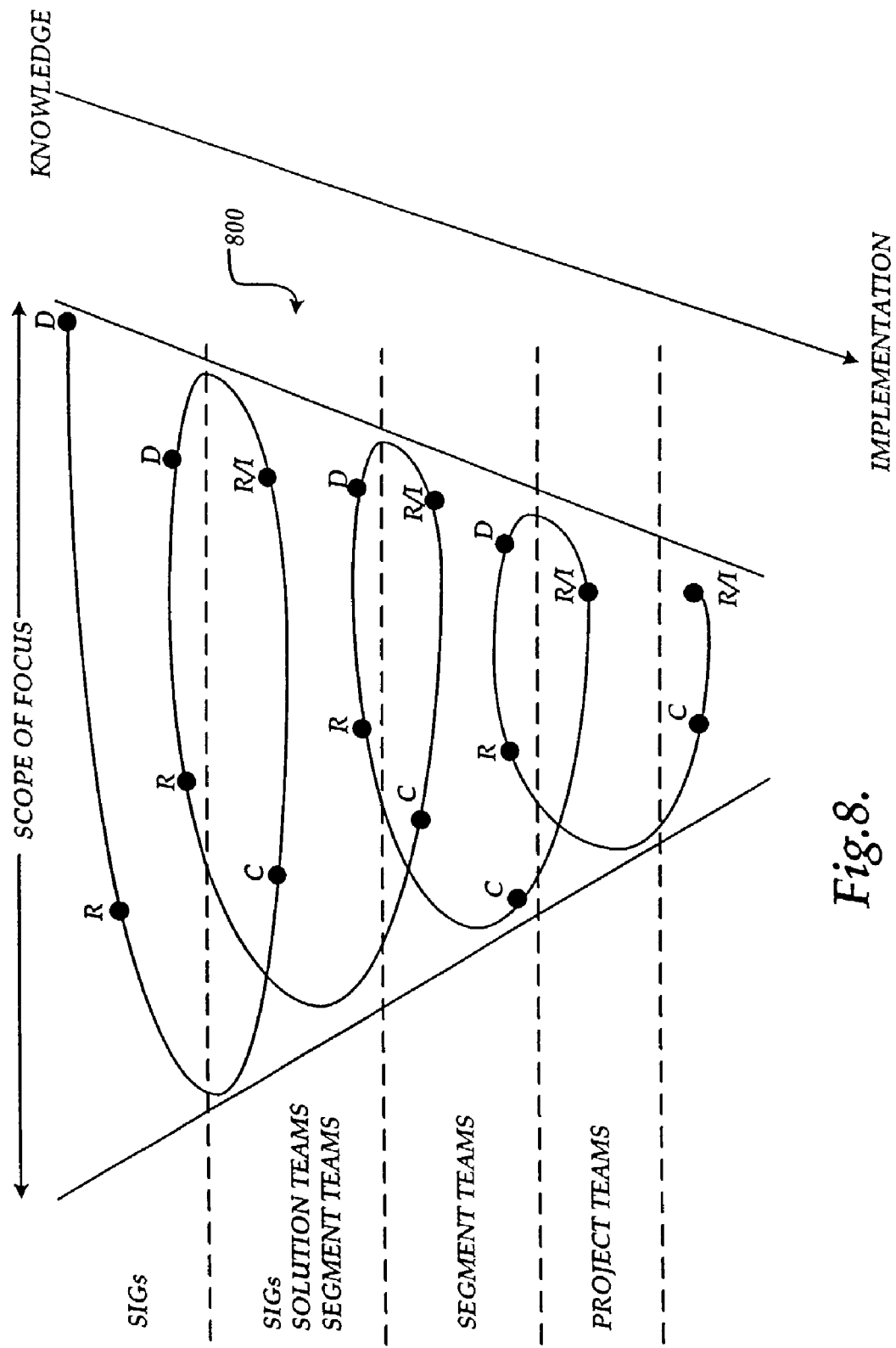
FIG. 8 is a three dimensional perspective diagram illustrating aspects of a process for applying technology to organizations and technical infrastructure according to one embodiment of the invention.

Referring now to FIG. 8, additional details regarding the various iterations of the routine 300 will be provided. In particular, a cyclic diagram 800 will be described that illustrates the iterative nature of the routine 300. In particular, the diagram 800 shows a "cyclone" that illustrates the various iterations of the routine 300. The cyclone is labeled variously with the letters "D", for discover, "R" for refresh, "C" for communication, and "R/I" for refocus/implement. "R/I" at the top indicates a period of prototype development and experimentation for a technology. "R/I" at the next layer down indicates a period of evaluation and trial for the technology. "R/I" at the next layer down indicates a period where a pilot implementation of the technology occurs. Finally, the "R/I" layer at the bottom indicates a period where the technology is put into production and deployment. Each of the letters corresponds to a respective portion of the routine 300. In this manner, the cyclone may be 'read' from the top down.

The first iteration of the process 300 is represented by the top portion of the cyclone, and is performed by the special interest groups 16A–N. This iteration represents a proactive investigation of technology trends and themes independent of any particular architectural or infrastructure component. As also shown in FIG. 8, the scope of the focus of the first iteration is very wide. The second iteration represents the development of recommendations for various architecture solutions based upon business opportunities. The architecture solution generally drives the target architecture and desired states, and integrates technology issues from more than one technology architecture segment. The second iteration is more narrowly focused than the first and involves SIGs 16A–N, solution teams 18, and segment teams 14A–N.

The third iteration of the cyclone represents driving the SOE 20 for the technical infrastructure. The SOE 20 moves the architecture segments toward the technology desired state based upon natural business factors. The third iteration is more narrow than the first two and typically involves the segment teams 14A–N. The fourth iteration represents implementation of new technologies into the technical infrastructure itself. The fourth iteration is the most narrowly focused and is performed by the project teams. According to one embodiment of the invention, the various iterations are performed upon a calendar year basis. Moreover, it should be appreciated that any given technology may be considered at any iteration of the cyclone. Therefore, at any given time, various technologies may be in an identification stage and other technologies may be in an implementation stage.

Figure 9:
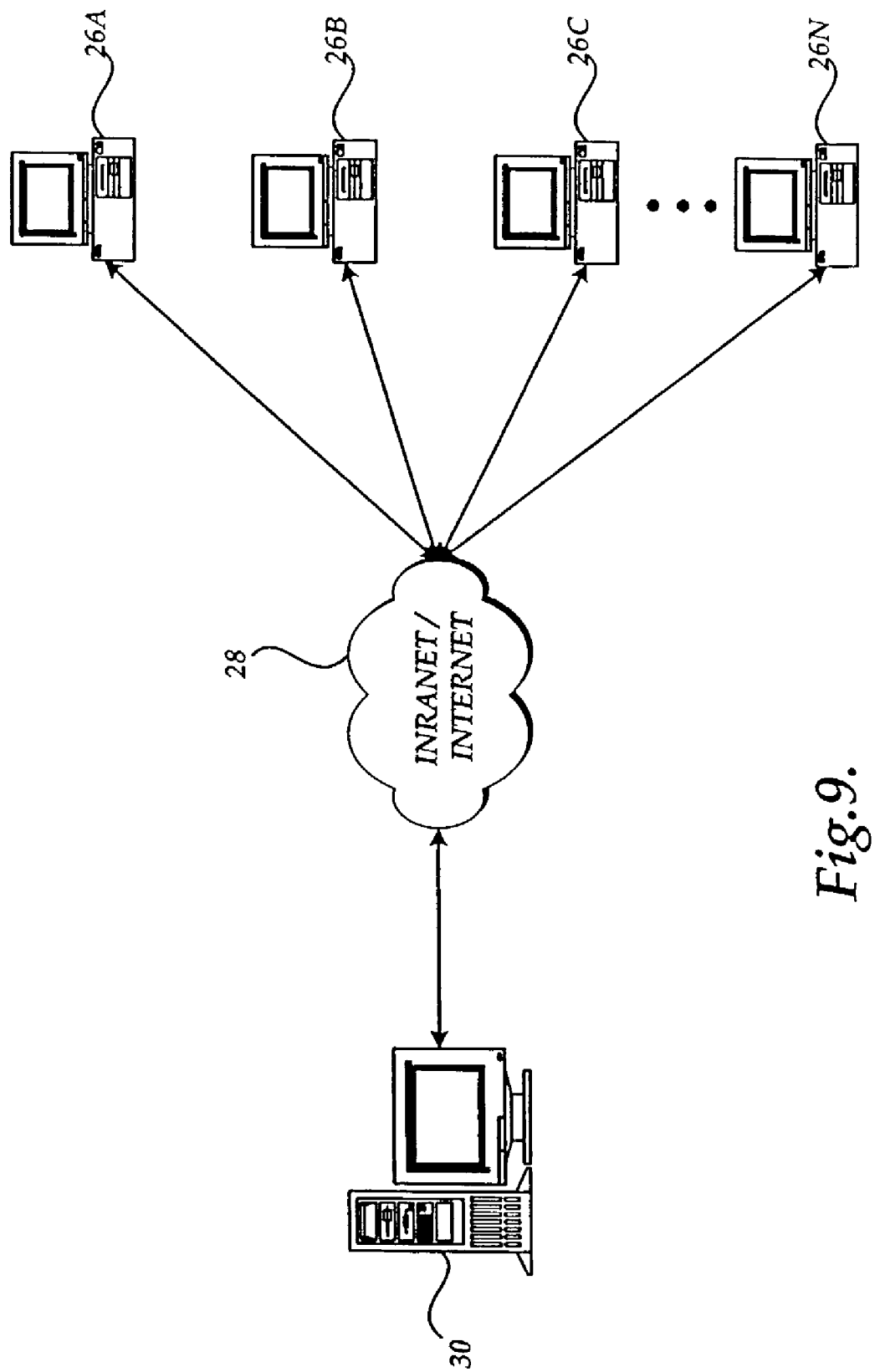
FIG. 9 is a computer network diagram showing an illustrative operating environment utilized by the various embodiments of the present invention.

FIG. 9 shows an illustrative operating environment utilized by the various embodiments of the present invention to provide computer implementation of the various processes of the organization structures discussed above. The operating environment includes an architectural lifecycle management server 30 that is linked to a network 28. The network 28 may be an intranet such as an Ethernet based local area network ("LAN") or a wide area network ("WAN") such as the global internet. The network 28 links the server 30 to individual computers 26A–N that are the workstations of the various individuals of the organization structure of FIG. 1 or 2.

The network 28 allows the workstations 26A–N to be in-house or distributed across various geographic locations. For example, the council members may be located at many different geographic locations of the organization but may interact through data sent and received over the network 28. Additionally, the distributed environment of FIG. 9 facilitates the introduction of members of the outsourcing partners 26A–N into the activities of the council 2 and its delegates as shown and described in relation to FIG. 2.

Figure 10:
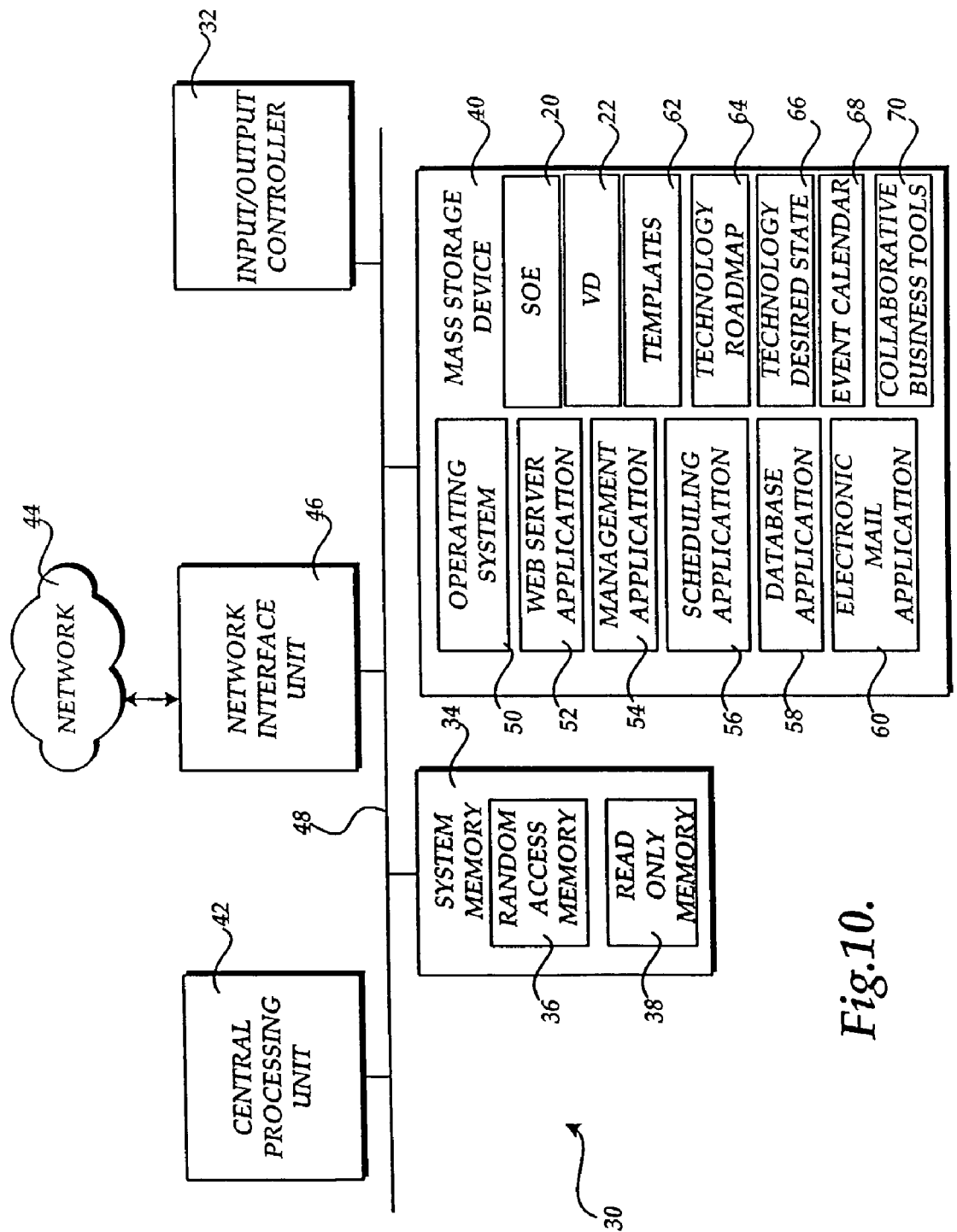
FIG. 10 is a computer architecture diagram illustrating aspects of a architecture lifecycle management server computer provided in various embodiments of the present invention.

FIG. 10 shows a computer architecture illustrating aspects of the architecture lifecycle management server computer 30. FIG. 10 and the following discussion are intended to provide a brief, general description of a suitable computing environment in which the invention may be implemented. While the invention will be described in the general context of program modules or applications that execute in conjunction with a management application program that runs on an operating system on a server computer, those skilled in the art will recognize that the invention may also be implemented in combination with other program modules and applications.

Generally, program modules and applications include routines, programs, components, data structures, and other types of structures that perform particular tasks or implement particular abstract data types. Moreover, those skilled in the art will appreciate that the invention may be practiced with other computer system configurations, including handheld devices, multiprocessor systems, microprocessor-based or programmable consumer electronics, minicomputers, mainframe computers, and the like. Although not necessarily, the invention may also be practiced in distributed computing environments such as shown in FIG. 9 where tasks are performed by remote processing devices that are linked through a communications network 28. In a distributed computing environment, program modules may be located in both local and remote memory storage devices.

Turning now to FIG. 10, an illustrative computer architecture for a server computer 30 for practicing the various embodiments of the invention will be described. The computer architecture shown in FIG. 10 illustrates a conventional server computer, including a central processing unit 42 ("CPU"), a system memory 34, including a random access memory 36 ("RAM") and a read-only memory ("ROM") 38, and a system bus 48 that couples the memory to the CPU 42. A basic input/output system containing the basic routines that help to transfer information between elements within the computer, such as during startup, is stored in the ROM 38. The server computer 30 further includes a mass storage device 40 for storing an operating system 50, application programs, such as the management application program 54, and data.

The mass storage device 40 is connected to the CPU 42 through a mass storage controller (not shown) connected to the bus 48. The mass storage device 40 and its associated computer-readable media, provide non-volatile storage for the server computer 30. Although the description of computer-readable media contained herein refers to a mass storage device, such as a hard disk or CD-ROM drive, it should be appreciated by those skilled in the art that computer-readable media can be any available media that can be accessed by the server computer 30.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

According to various embodiments of the invention, the server computer 30 may operate in a networked environment as shown in FIG. 9 using logical connections to remote computers through a network 28, such as the Internet. The server computer 30 may connect to the network 28 through a network interface unit 46 connected to the bus 48. It should be appreciated that the network interface unit 46 may also be utilized to connect to other types of networks and remote computer systems. The server computer 30 may also include an input/output controller 32 for receiving and processing input from a number of devices, including a keyboard or mouse (not shown). Similarly, an input/output controller 32 may provide output to a display screen, a printer, or other type of output device.

As mentioned briefly above, a number of program modules, applications, and data files may be stored in the mass storage device 40 and RAM 36 of the server computer 30, including an operating system 50 suitable for controlling the operation of a networked server computer 30. The mass storage device 40 and RAM 36 may also store one or more application programs including the management application program 54 and additional application programs discussed below that are used by the management application program 54.

The mass storage device 40 and RAM 36 may store the management application 54 that controls the flow of information between the workstations of participants in the organizational structure and to the various application components of the server 30 discussed below. The mass storage device 40 may also include a web server application 52 for providing web-based information such as on-line templates, chat rooms, hyperlinks, and information displays and demonstrations to the workstation computers linked to the server 30 over the network 28. Additionally, one of the application components of the server 30 is a scheduling application 56 which is utilized by the management application 54 to allow meetings to be set up for the council 2, the segment teams 14A–N, the SIGs 16A–N, and solution teams 18.

Another application component of the server 30 is a database application 58 that is utilized by the management application 54 to add, extract, or modify information from the SOE database 20, VD database 22, templates database 62, roadmap database 64, and desired state database 66. An email application 60 is another application component utilized by the management application 54 to provide notices of meetings set by the scheduler 56, to provide templates from the template database 62, to receive information from workstations, and to communicate database structures such as the SOE 20, VD 22, roadmap 64, and desired state 66. Other applications components are an event calendar 68 that tracks the scheduled meetings for the council members throughout the year and a collection of collaborative tools 70 that allow the members to share electronic information such as calendar dates and presentations.

Figure 11:
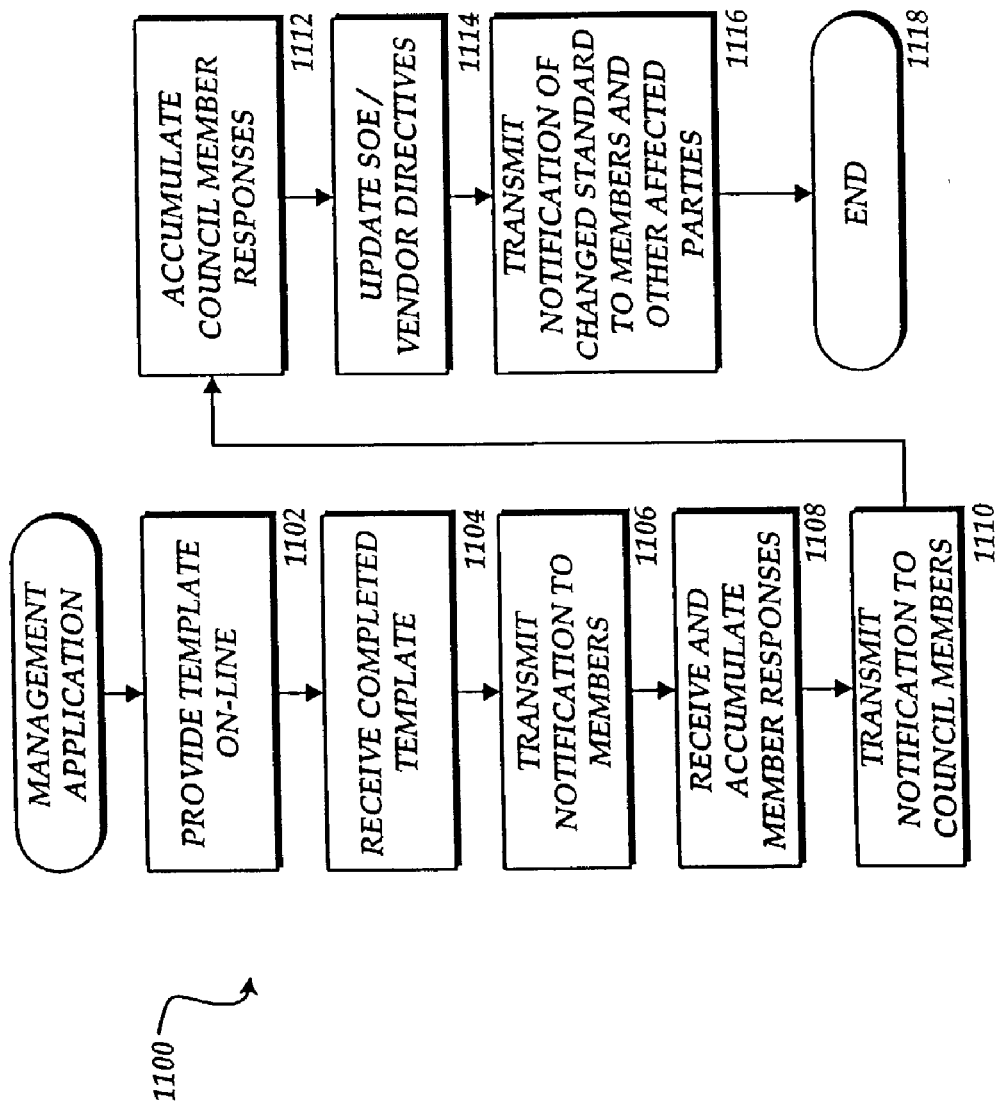
FIG. 11 is a flow diagram showing a computer-implemented process for managing the implementation and evolution of an information technology architecture provided according to one embodiment of the invention.

FIG. 11 shows one example of the operational flow 1100 of the management application 54 to facilitate the processes of the organizational structure of FIG. 1 or 2. The application 54 provides an appropriate template to an organization member such as a member of a delegate group or team at template operation 1102, either by emailing the template from the template database 62 or by providing a web accessible template through the web server application 52. The server 30 receives the completed template at template operation 1104. The server 30 then transmits a notification of the received template information to all the members of the organization structure such as by email at notification operation 1106.

The organizational members respond in a predefined way, such as by accepting or rejecting particular aspects of the proposals entered through the templates, and the responses are sent back to the server 30, either through a return email or through web based data entry. The server 30 receives and accumulates the member responses at response operation 1108. The accumulated responses may show the amount of acceptances versus rejections that have occurred. Predefined thresholds may be set up as a filter so that the management application 54 may eliminate proposals or promote proposals up the chain to the council 2. For example, one proposal may be promoted if it is accepted by a simple majority of organizational members while another proposal may be promoted only if it has been accepted unanimously.

After accumulating the responses, the management application 54 transmits a notification of the proposals accepted by the organization members at notification operation 1110. The council members receive the notification of the proposals which then provides the council members the ability to accept or reject the proposals that survived the voting process of the organizational members. The server 30 receives and accumulates the responses at response operation 1112. Again, predefined thresholds may be set up as a filter for the council member votes.

Once the proposals that have been accepted by the council members have been determined, the management application 54 updates the SOE 20 and/or VD 22 depending upon the nature of the proposal at update operation 1114. For example, a future standard set forth in the VD 22 may be adopted or changed based on this iteration of the management application process. Once these database structures have been updated, the changes to the SOE 20 and/or VD 22 are communicated from the server 30 to the organizational members, council members, and other affected parties such as the technology and business unit members of the organization and the outsourcing partners at notification operation 1116.

Figure 12:
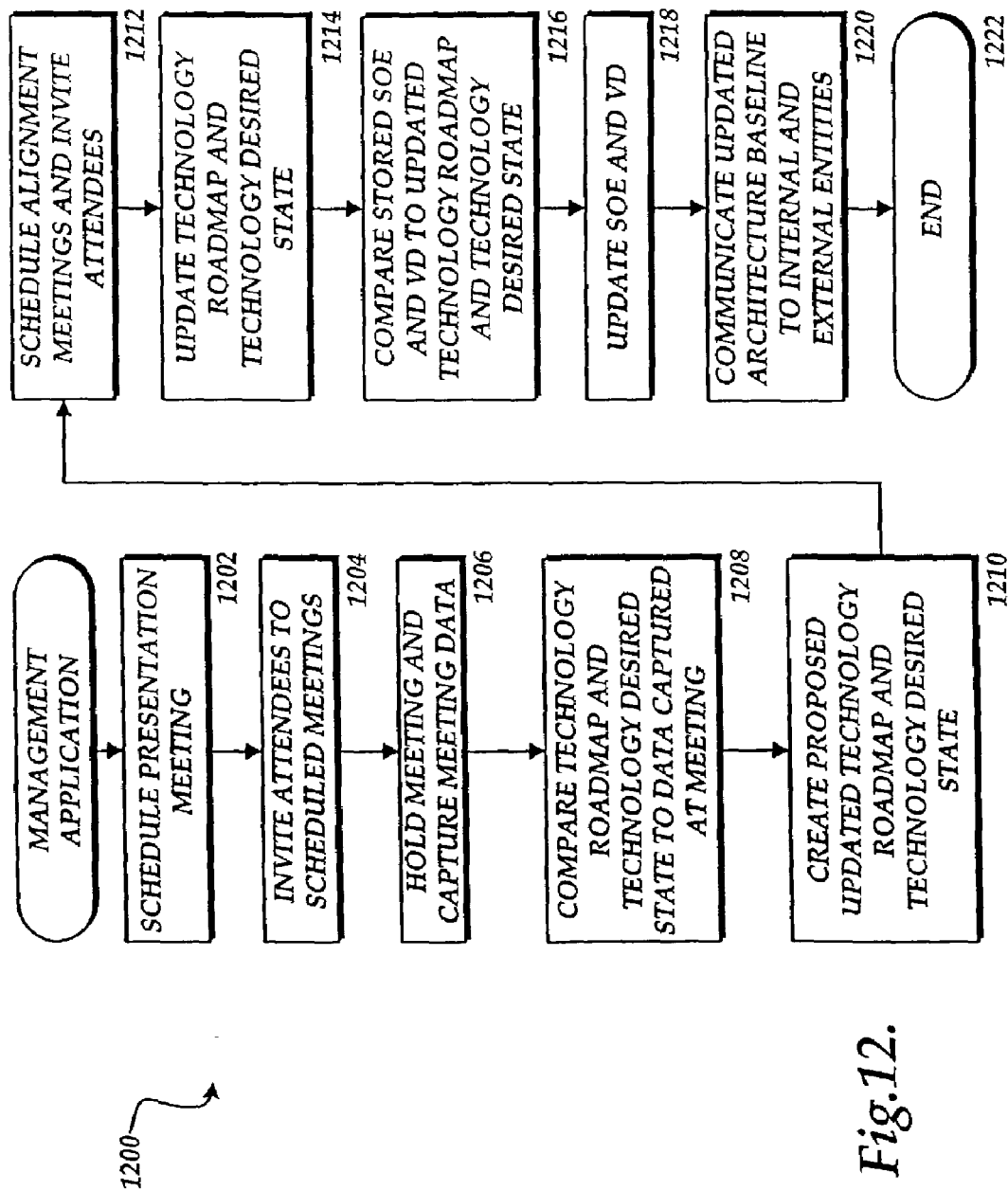
FIG. 12 is a flow diagram showing a computer-implemented process for applying technology to organizations and technical infrastructure according to one embodiment of the invention.

Referring now to FIG. 12, another embodiment of the management application 54 for facilitating the processes of the organizational structure of FIG. 1 or 2 will be described. The routine 1200 begins at block 1202, where a presentation meeting is scheduled by the presentation application 54. The presentation meeting provides an opportunity for business and industry leaders, key vendors/partners, and research organizations to provide presentations on new and emerging technologies. A template 62 may be utilized to invite the various participants to the meeting and to format their presentations.

From block 1202, the routine 1200 continues to block 1204, where the various attendees are invited to participate in the presentation meeting. The invitations may be transmitted electronically by the e-mail application 60 or through other types of electronic means. The routine 1200 then continues to block 1206, where the presentation meeting is held. All data presented at the meeting regarding new technologies and technology trends is captured into a database supported by the database application 58. The routine 1200 then continues from block 1206 to block 1208.

At block 1208, electronically stored versions of the technology roadmap and the technology desired state are compared to the data captured at the presentation meeting. Differences between the data are identified and the differences are utilized to update the technology desired state and the technology roadmap at block 1210. In this manner, a proposed technology roadmap and technology desired state are created. From block 1210, the routine 1200 continues to block 1212.

At block 1212, an alignment meeting is scheduled at which the proposed technology roadmap and technology desired state are described with technical and business units within the organization. As described above, a template 62, scheduling application 56, and e-mail application 60 may be utilized to schedule the meeting. Once the alignment meeting has been held, the routine 1200 continues to block 1214.

At block 1214, the technology roadmap and technology desired state are revised in view of the data presented at the alignment meeting. The database application 58 may be utilized to create the revised technology roadmap and desired state. The routine 1200 then continues to block 1216, where the SOE 20 and vendor directives 22 are compared to the revised technology roadmap and desired state to identify differences. The SOE 20 and vendor directives 22 are then updated at block 1218 to reflect the changes in the technology roadmap and technology desired state.

From block 1218, the routine 1200 continues to block 1220, where the updated SOE 20 and vendor directives 22 are communicated to external organizations. As described above, the SOE 20 and vendor directives 22 may be transmitted to a sourcing partner of the organization, a vendor or potential vendor of the organization, or providers of the organization. Additionally, the SOE 20 and the vendor directives 22 may be communicated to internal business and technical organizations. According to various embodiments of the invention, the SOE 20 and vendor directives 22 may be transmitted to the external organizations utilizing e-mail, a web site, or through a meeting scheduled by the scheduling application 56. The scheduling application 56 may also be utilized to record the attendees of the meeting. The routine 1200 then continues from block 1220 to block 1222, where it ends.

Turning now to FIG. 13, additional details regarding the structure and content of the SOE 20 will be described. As mentioned briefly above, the SOE 20 identifies the segments within the organization and the implemented technologies of the organization for each segment. Also specified for each implemented technology is its current stage within the lifecycle of the technology. The SOE 20 may be conveyed to outsourcing partners and preferred vendors 24 to allow these external entities to easily identify the technologies being implemented and the amount of life remaining in the current implementation.

According to one embodiment of the invention, the SOE 20 comprises a data structure stored on a computer-readable medium. In particular, the SOE 20 includes data fields 68A–68L that identify each segment within an organization, each technology standard within each segment, a product standard utilized to implement each technology standard, and a technology lifecycle stage for the product standard. For example, the segment data field 68A identifies the particular segment to which the SOE 20 applies. Different SOEs 20 may be created for different segments or the technology utilized within multiple segments may be described within the same SOE 20.

For each segment data field 68A, a service data field 68B identifies the various technology services. For instance, as shown in FIG. 13, the service data field 68B identifies the graphical presentation service, the distributed object computing service, and the database access service. Additional services may be identified by the service data field 68B in a similar manner.

For each service identified in the service data field 68B, a component data field 68C identifies one or more components utilized within the service. For instance, in the illustrative SOE 20 shown in FIG. 13, the component data field 68C identifies the web browser and WINDOWS applications components of the graphical presentation service. For each identified component, a technology standard data field 68D identifies one or more technology standards for the corresponding technology service. For instance, in FIG. 13 the technology standard data field 68D identifies the HTML standard for the graphical presentation service. Additionally, a product data field 68F is provided that identifies a product standard for implementing the technology standard. As an example, MICROSOFT INTERNET EXPLORER and NETSCAPE NAVIGATOR are identified by the product data field 68F as product standards for implementing the HTML technology standard in FIG. 13. Additionally, a vendor data field 68E may identify a specific vendor for supplying the products identified by the contents of the product data field 68F.

According to one embodiment of the invention, the SOE 20 may also include one or more data fields for storing data identifying a technology lifecycle stage for the product standard identified by the contents of the technology standard field 68D. Current status is represented by the flag CUR and future state changes are represented by effective dates. In particular, a core data field 68G may be defined for indicating that the product standard is a core component of the information technology architecture. A declining data field 68H may also be provided for indicating that usage of the product standard is declining. A special use data field 68J may be provided for indicating that any use of the technology standard within the architecture is a special use. Moreover, an emerging data field 68K may be provided for indicating that the technology standard is an emerging standard. A retire data field 68I may be provided for indicating that the product standard is being retired. The retire data field 68I may also include a date indicated when the product standard will be retired. An "avoid" data field may be provided indicating specific products to be avoided. A remarks data field 68L may also be provided for including notes or other remarks regarding the technology or product standards.

It should be appreciated that according to the various embodiments of the present invention, the SOE 20 may be stored as a database on a computer-readable medium. It should also be appreciated that any of the data fields 68A–68L may refer to data fields stored in SOEs 20 for different segments. For instance, the contents of the data field 68F corresponding to the database access service contain a reference to the DMM segment. In such a scenario, the SOE 20 for the DMM segment should be consulted to determine the product standard for database access.

According to yet another embodiment of the invention, the SOE 20 is expressed as an extensible markup language data structure. According to this embodiment of the invention, each of the fields 68A–68L is assigned a unique tag. In particular, the segment data field 68A is represented utilizing a segment tag indicative of a segment of the information technology architecture, the service data field 68B is represented utilizing a service tag indicative of a technology service within the identified segment, and the component data field 68C is represented using a component tag that identifies a particular component of the service. Additionally, the technology standard data field 68D is represented utilizing one or more technology standard tags indicative of a technology standard for the technology service, the vendor data field 68E is represented utilizing a vendor tag indicative of a vendor for products implementing the product standard, and the product standard data field 68F is represented using a product standard tag indicative of a product standard for implementing the technology standard.

According to one embodiment of the, the extensible markup language data structure provided herein also comprises one or more tags indicative of a technology lifestyle stage for the product standard. In particular, tags may be provided for indicating that the product standard is in a declining stage, that the product standard is in an emerging stage, that a use of the product standard is a special use, or that the product standard is being retired. Other tags may also be provided for identifying other aspects of the standard operating environment for the technical architecture.

Referring now to FIG. 14, additional details regarding the structure and content of the VD 22 will be described. As described briefly above, the VD 22 sets forth the currently implemented components of an information technology architecture. Moreover, the VD 22 also sets forth the future direction for each of the components. The VD 22 may be transmitted to one or more vendors, suppliers, or partners external to the organization implementing the information technology architecture. Through the use of the VD 22, the external vendors may select additional components for the information technology architecture compatible with current and future iterations of the architecture.

According to one embodiment of the invention, the VD 22 comprises a data structure stored on a computer-readable medium. In particular, the VD 22 includes data fields 68M–68P that define the contents of the VD 22. The architectural components data field 68M contains data that identifies a particular component of an information technology architecture for an organization. For instance, the architectural components data field 68M may identify the particular components utilized to implement an application technical environment, such as request/reply software, asynchronous messaging software, a web applications server, and other such components. According to the various embodiments of the invention, the architectural components data field 68M may identify the components of an application technical environment, network-based services, content management services, data management and movement, security, network and systems management, enterprise storage, server platform, network, telephony, and, application development components.

According to one embodiment of the invention, the VD 22 also includes a current standard data field 68N. The current standard data field 68N contains data identifying a current technical standard for each component of the information technology architecture identified in the architectural components data field 68M. For instance, as shown in FIG. 14, the current standard data field 68N identifies INTERNET EXPLORER and NETSCAPE COMMUNICATOR as the current standard for the web browser architectural component identified in the corresponding portion of the architectural components data field 68M.

According to another embodiment of the invention, the VD 22 also includes a future direction data field 68P. The future direction data field 68P contains data that identifies a future technical standard for each component of the information technology architecture identified in the architectural components data field 68M. For instance, as also shown in FIG. 14, the future direction data field 68P identifies INTERNET EXPLORER as the future standard for the web browser architectural component identified in the corresponding portion of the architectural components data field 68M. In this manner, the VD 22 can indicate to external vendors and suppliers the current components of the information technology architecture and the components likely to be utilized in the future.

According to one embodiment of the present invention, the VD 22 may be expressed using extensible markup language ("XML"). As known to those skilled in the art, XML is a meta-markup language that provides a format for describing structured data. XML provides a uniform method for describing and exchanging data in an open, text-based format and typically delivers the data by use of the standard hyper-text transport protocol ("HTTP").

According to the embodiment of the invention wherein the VD 22 is expressed using XML, the architectural components data field 68M, the future direction data field 68P, and the current standard data field 68N may be expressed using XML tags. For instance, the architectural components data field 68M may be expressed as an architectural components tag, the current standard data field 68N may be expressed as current standard tags, and the future direction data field 68P may be expressed as future direction tags. In this manner, the entire contents of the VD 22 may be expressed using XML.

As described briefly above, according to the various embodiments of the invention, the VD 22 may be stored in a database maintained by the architecture lifecycle management server 30. The VD 22 may also be transmitted from the architecture lifecycle management server 30 to computers operated by one or more vendors 24. In this manner, the vendors 24 may utilize the VD 22 when selecting new components for the information technology architecture. According to other embodiments of the invention, the VD 22 may be stored as a printed product.

Although the present invention has been described in connection with various exemplary embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

We claim:

1. A computer-readable medium having stored thereon a data structure for enabling a computer to communicate information technology architecture for an organization, the data structure comprising computer-executable instructions which, when executed by a computer, will cause the computer to:

identify via data contained in a first data field of the data structure, a component of an information technology architecture for an organization;

identify via data contained in a second data field of the data structure, a current standard for the component of the information technology architecture identified via the data contained in the first data field;

identify via data contained in a third data field of the data structure, a technology trend for the component of technology architecture identified via the data contained in the first data field, the data structure further comprising computer-readable information enabling the computer to identify via data contained in a fourth data field of the data structure, a future standard to be utilized for the component of the information technology architecture after the current standard is retired; and the data structure is:

sent from an architecture lifecycle management server to a server operated by one or more vendor organizations; and used by the vendor organizations to identify technologies compatible with the information technology architecture.

2. The computer-readable medium of claim 1, wherein the data structure is expressed using an extensible markup language.

3. The computer-readable medium of claim 2, wherein the first data field comprises one or more of an application technical environment, application development components, network-based services, content management services, data management and movement, security, network and systems management, enterprise storage, server platform, network, and telephony.

4. An architecture lifecycle management server configured to communicate with the server operated by one or more vendor organizations by executing the computer-executable instructions of the data structure of claim 1.

5. The computer-readable medium of claim 1, wherein the technology trend identified by the data contained in the third field of the data structure is further determined based on feedback from the vendor organizations.

6. An extensible markup language data structure for use in enabling a computer to communicate vendor directives to one or more vendor organizations, the extensible markup language data structure comprising computer-executable instructions which, when executed by a computer, will cause the computer to:

identify via one or more architectural component tags indicative of one component of an information technology architecture for an organization, the one component, wherein the architectural component tags comprise at least one from set of: of an application technical environment, application development components, network-based services, content management services, data management and movement, security, network and systems management enterprise storage, server platform, network and telephony;

identify via one or more current standard tags corresponding to each architecture component tag and indicative of a current standard for the one component of the information technology architecture, the current standard;

identify via one or more future direction tags corresponding to each architecture component tag and indicative of a future standard for the component of the information technology architecture, the future standard to be utilized after the current standard is retired; and identify via one or more trend tags corresponding to each architecture component tag, and indicative of technology trends for the one component of the information technology architecture; and the data structure is:

sent from an architecture lifecycle management server to a server operated by the one or more vendor organizations; and used by the vendor organizations to identify technologies compatible with the information technology architecture.

7. A computer-readable medium having stored thereon the extensible markup language data structure of claim 6.

8. An architecture lifecycle management server configured to communicate the vendor directives to one or more vendor organizations employing the extensible markup language data structure of claim 6.

9. A computer-readable medium having stored thereon a data structure for enabling a computer to communicate information technology architecture for an organization, the data structure comprising computer-executable instructions which, when executed by a computer, will cause the computer to:

identify via data contained in a first data field of the data structure, a component of an information technology architecture for an organization, the first data field comprising one or more of an application technical environment, application development components, network-based services, content management services, data management and movement, security, network and systems management, enterprise storage server platform, network, and telephony;

identify via data contained in a second data field of the data structure, a current standard for the component of the information technology architecture identified via data contained in the first data field;

identify via data contained in a third data field of the data structure, a technology trend for the component of technology architecture identified via the data contained in the first data field; and identify via data contained in a fourth data field of the data structure, a future standard to be utilized after the current standard is retired for the component of the information technology architecture identified via data contained in the first data field; and the data structure is:

sent from an architecture lifecycle management server to a server operated by the one or more vendor organizations; and used by the vendor organizations to identify technologies compatible with the information technology architecture.

10. The computer-readable medium of claim 9, wherein the data structure is expressed using an extensible markup language.

* * * * *